United States Patent Office 3,316,152
Patented Apr. 25, 1967

3,316,152
NOVEL ESTERS OF TRIAMCINOLONE ACETONIDE
Joachim Heider and Gerhard Dahms, Biberach an der Riss, and Dietrich Jerchel, Ingelheim am Rhine, Germany, assignors to Boehringer Ingelheim G.m.b.H., Ingelheim am Rhine, Germany, a corporation of Germany
No Drawing. Filed Jan. 28, 1965, Ser. No. 428,874
Claims priority, application Germany, Jan. 31, 1964, T 25,530
21 Claims. (Cl. 167—65)

The invention relates to novel esters of triamcinolone acetonide of the formula

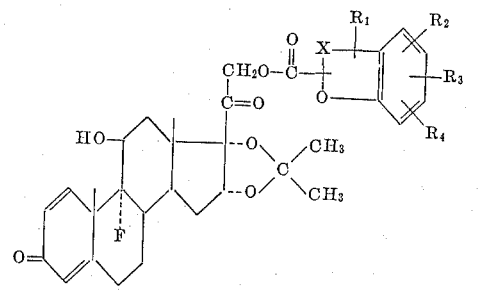

(I)

wherein $R_1$ is selected from the group consisting of hydrogen, lower alkyl of 1 to 7 carbon atoms and phenyl, $R_2$ is selected from the group consisting of hydrogen, halogen, hydroxyl, nitro, lower alkyl and lower alkoxy of 1 to 7 carbon atoms, benzyloxy, phenoxy and phenyl, $R_3$ is selected from the group consisting of hydrogen, halogen, nitro and lower alkyl and lower alkoxy of 1 to 7 carbon atoms, $R_4$ is selected from the group consisting of hydrogen and lower alkoxy of 1 to 7 carbon atoms and X is selected from the group consisting of —$CH_2$—$CH_2$—O—, —CH=CH—O—, —$CH_2$—$CH_2$— and —CH=CH—. The invention also relates to novel compositions having glucocorticoidal and anti-phlogistic properties and to a novel method of inhibiting inflammation in warm-blooded animals.

Numerous esters of cortico steroids are known but the esters of Formula I have an unexpectedly strong glucocorticoidal and anti-phlogistic properties which are greatly superior to even triamcinolone acetonide, the most effective compound known so far.

It is an object of the invention to provide the novel triamcinolone acetonide esters of Formula I.

It is another object of the invention to provide novel compositions having glucocorticoid and antiphlogistic properties.

It is an additional object of the invention to provide a novel method of inhibiting inflammation in animals.

These and other objects and advantages of the invention will become obvious from the following detailed description.

The novel triamcinolone acetonide esters of the invention have the formula

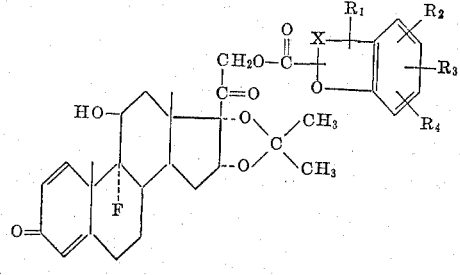

(I)

wherein $R_1$ is selected from the group consisting of hydrogen, lower alkyl of 1 to 7 carbon atoms and phenyl, $R_2$ is selected from the group consisting of hydrogen, halogen, hydroxyl, nitro, lower alkyl and lower alkoxy of 1 to 7 carbon atoms, benzyloxy, phenoxy and phenyl, $R_3$ is selected from the group consisting of hydrogen, halogen, nitro and lower alkyl and lower alkoxy of 1 to 7 carbon atoms, $R_4$ is selected from the group consisting of hydrogen and lower alkoxy of 1 to 7 carbon atoms and X is selected from the group consisting of —$CH_2$—$CH_2$—O—, —CH=CH—O—, —$CH_2$—$CH_2$— and —CH=CH—.

Examples of suitable carboxylic acids to form the triamcinolone esters of Formula I are benzofurancarboxylic acids such as benzofuran-2-carboxylic acid, 3-methyl-benzofuran-2-carboxylic acid, 7-methoxy-benzofuran-2-carboxylic acid, 5,7-dibromo-benzofuran-3-carboxylic acid, 2 - phenyl-5,6,7-trimethoxy-benzofuran-2-carboxylic acid, 5,7-dinitro-benzofuran-3-carboxylic acid, 5-chloro-benzofuran-3-carboxylic acid, 6-benzyloxybenzofuran-2-carboxylic acid, 2,3-dihydrobenzofuran-2-carboxylic acid, etc. and 1,4-benzodioxane carboxylic acids such as 1,4-benzodioxane-3-carboxylic acid, 7-methyl-1,4-benzodioxane-3-carboxylic acid, 8-methoxy-1,4-benzodioxane-3-carboxylic acid, 7-methyl-1,4-benzodioxane-3-carboxylic acid, 5-nitro-7-methyl-1,4-benzodioxane-3-carboxylic acid, 7-chloro-1,4-benzodioxane-2-carboxylic acid, 3-methyl-1,4-benzodioxane - 2 - carboxylic acid, 1,4-benzodioxine - 3 - carboxylic acid, etc.

The novel triamcinolone esters of Formula I can be made by a variety of well known esterification methods. The best results are obtained from the reaction of triamcinolone acetonide with an esterification derivative of a carboxylic acid of the formula

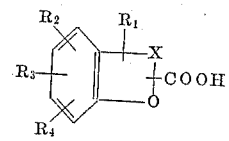

(II)

wherein $R_1$, $R_2$, $R_3$, $R_4$ and X have the above definitions. Suitable esterification derivatives are their symmetrical or mixed anhydrides, acid halides and imidazolides. The esterification is usually conducted in the presence of an inert organic solvent such as tetrahydrofuran, dioxane, dimethylformamide, etc. at temperatures from 0 to 90° C. If an acid halide is used, the reaction is preferably effected in the presence of a hydrogen halide binding agent such as pyridine which may simultaneously serve as the solvent.

A preferred mode of esterification comprises reacting an imidazolide of a carboxylic acid of Formula II with triamcinolone acetonide at room temperature, preferably in the presence of an alkali metal salt of imidazol as a catalyst, to obtain good yields of pure product. The imidazolide can be formed by reacting diimidazol sulfone with the desired carboxylic acid of Formula II in an inert organic solvent and the resulting solution of imidazolide can be used for the esterification without isolating the imidazolide.

The triamcinolone acetonide esters of Formula I can also be formed by reacting the acetonide of a 9α-fluoro-21-halo-$\Delta^{1,4}$-pregnadiene-11β,16α,17α - triol - 3,20 - dione with an alkali metal or silver salt of a carboxylic acid ester of Formula II.

The novel compositions of the invention having gluocorticoidal and anti-phlogistic properties are comprised of a triamcinolone acetonide ester of the formula

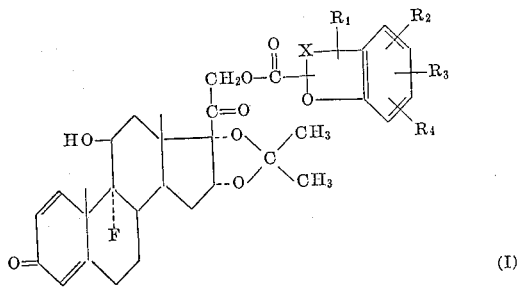

wherein $R_1$ is selected from the group consisting of hydrogen, lower alkyl of 1 to 7 carbon atoms and phenyl, $R_2$ is selected from the group consisting of hydrogen, halogen, hydroxyl, nitro, lower alkyl and lower alkoxy of 1 to 7 carbon atoms, benzoyloxy, phenoxy and phenyl, $R_3$ is selected from the group consisting of hydrogen, halogen, nitro and lower alkyl and lower alkoxy of 1 to 7 carbon atoms, $R_4$ is selected from the group consisting of hydrogen and lower alkoxy of 1 to 7 carbon atoms and X is selected from the group consisting of

—CH=CH—O—, $CH_2$—$CH_2$— and —CH=CH— and a major amount of a pharmaceutical carrier. For external local applications, the concentration of the said esters is usually between 0.02 to 0.1%, preferably about 0.05%.

The novel method of inhibiting inflammation in animals comprises administering daily an effective amount of a triamcinolone acetonide ester of the formula

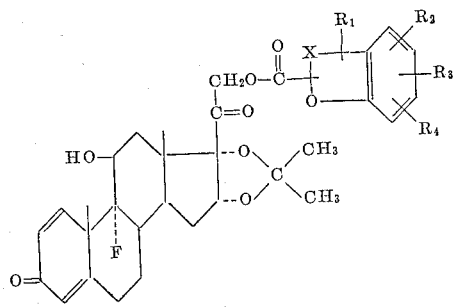

wherein $R_1$ is selected from the group consisting of hydrogen, lower alkyl of 1 to 7 carbon atoms and phenyl, $R_2$ is selected from the group consisting of hydrogen, halogen, hydroxyl, nitro, lower alkyl and lower alkoxy of 1 to 7 carbon atoms, benzyloxy, phenoxy and phenyl, $R_3$ is selected from the group consisting of hydrogen, halogen, nitro and lower alkyl and lower alkoxy of 1 to 7 carbon atoms, $R_4$ is selected from the group consisting of hydrogen and lower alkoxy of 1 to 7 carbon atoms and X is selected from the group consisting of

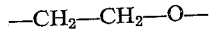

—CH=CH—O—, $CH_2$—$CH_2$— and —CH=CH—.

In the following examples there are described several preferred embodiments to illustrate the invention. However, it should be understood that the invention is not intended to be limited to the specific embodiments.

EXAMPLE I

*Preparation of the 21-(2,3-dihydrobenzofuran-2-carboxylic acid ester) of triamcinolone acetonide*

0.5 gm. of triamcinolone acetonide dissolved in 3 cc. of pyridine was admixed with 0.23 gm. of dihydrocumarilic acid chloride dissolved in 3 cc. of dimethylformamide and the mixture was allowed to stand for 17 hours. The resulting solution was poured into a mixture of semi-concentrated hydrochloric acid and acetone (1:1 ratio) and water was slowly added thereto to precipitate the 21-(2,3-dihydrobenzofuran-2-carboxylic acid ester) of triamcinolone acetonide. The said ester was refluxed in ethanol with carbon for a short time and the solution was filtered and 0.39 gm. (67% yield) of the ester recrystallized from ethanol to give a white product having a melting point of 244° C.

EXAMPLE II

*Preparation of the 21-(benzofuran-2-carboxylic acid ester) of triamcinolone acetonide*

0.5 gm. of triamcinolone dissolved in 3 cc. of pyridine was admixed with 0.23 gm. of benzofuran-2-carboxylic acid chloride dissolved in 4 cc. of pyridine and the mixture was allowed to stand at a temperature of 45° C. for three days. After working up the product as described in Example I, 0.43 gm. (64% yield) of white 21-(benzofuran-2-carboxylic acid ester) of triamcinolone acetonide having a melting point of 250° C. was obtained.

EXAMPLE III

*Preparation of the 21-(1,4-benzodioxane-3-carboxylic acid ester) of triamcinolone acetonide*

0.5 gm. of triamcinolone acetonide dissolved in 3 cc. of pyridine was admixed with 0.26 gm. of 1,4-benzodioxane-3-carboxylic acid chloride dissolved in 3 cc. of pyridine and the resulting solution was held at 45° C. for 24 hours. Using the procedure of Example I, 0.42 gm. (63% yield) of the 21 - (1,4 - benzodioxane-3-carboxylic acid ester) of triamcinolone acetonide having a melting point of 255° C. were obtained.

EXAMPLE IV

*Preparation of the 21-(7-methyl-1,4-benzodioxane-3-carboxylic acid ester) of triamcinolone acetonide*

0.5 gm. of triamcinolone acetonide dissolved in 3 cc. of pyridine was admixed with 0.27 gm. of 7-methyl-1,4-benzodioxane-3-carboxylic acid chloride in 3 cc. of pyridine and the resulting solution was held at 45° C. for 26 hours. Using the procedure of Example I, 0.69 gm. (98% yield) of white 21-(7-methyl-1,4-benzodioxane-3-carboxylic acid ester) of triamcinolone acetonide having a melting point of 140° C. were obtained.

EXAMPLE V

*Preparation of the 21-(8-methoxy-1,4-benzodioxane-3-carboxylic acid ester) of triamcinolone acetonide*

0.54 cc. of thionyl chloride were added dropwise to 2 gm. of imidazole dissolved in 60 cc. of tetrahydrofuran and the precipitated imidazole hydrochloride was removed by suction filtration under a nitrogen atmosphere. Then, 0.25 gm. of 8 - methoxy - 1,4-benzodioxane-3-carboxylic acid was added to the filtrate and after shaking the solution for 30 minutes, 0.5 gm. of triamcinolone acetonide was added thereto with about 0.07 mole of sodium imidazol as a catalyst. The solution was shaken for 3 days at room temperature after which it was determined by thin layer chromatography that the reaction was complete. The reaction solution was concentrated in a rotation evaporator and the residue was triturated with water. After the undissolved particles were suction filtered, the residue was recrystallized from a mixture of water and ethanol to obtain a 52% yield of white 21-(8-methoxy-1,4-benzodioxane-3-carboxylic acid ester) of triamcinolone acetonide having a melting point of 195 to 200° C. with decomposition.

EXAMPLE VI

*Preparation of 21-(7-methyl-1,4-benzodioxane-3-carboxylic acid ester) of triamcinolone acetonide*

Using the procedure of Example V, 0.5 gm. of triamcinolone acetonide and 0.25 gm. of 7-methyl-1,4-benzodioxane-3-carboxylic acid were reacted for 5 days to obtain a 76% yield of white 21-(7-methyl-1,4-benzodioxane-3-carboxylic acid ester) of triamcinolone acetonide having a melting point of 137° C.

EXAMPLE VII

*Preparation of 21-(5-nitro-7-methyl-1,4-benzodioxane-3-carboxylic acid ester) of triamcinolone acetonide*

Using the procedure of Example I, 0.5 gm. of triamcinolone and 0.886 gm. of 5-nitro-7-methyl-1,4-benzodioxane-3-carboxylic acid chloride were reacted at 50° C. for seven hours to obtain a 27% yield of light yellow 21 - (5-nitro-7-methyl-1,4-benzodioxane-3-carboxylic acid ester) of triamcinolone ester having a melting point of 169 to 171° C.

EXAMPLE VIII

*Preparation of 21-(3-methyl-benzofuran-2-carboxylic acid ester) of triamcinolone acetonide*

Using the procedure of Example I, 0.5 gm. of triamcinolone acetonide and 0.448 gm. of 3-methyl-benzofuran-2-carboxylic acid chloride were reacted for 2 hours at room temperature to obtain a 97% yield of white 21-(3-methyl-benzofuran-2-carboxylic acid ester) of triamcinolone acetonide having a melting point of 191 to 193° C.

EXAMPLE IX

*Preparation of 21-(7-methoxy-benzofuran-2-carboxylic acid ester) of triamcinolone acetonide*

Using the procedure of Example I, 0.5 gm. of triamcinolone acetonide and 0.485 gm. of 7-methoxy-benzofuran-2-carboxylic acid chloride were reacted 2 days at room temperature to obtain a 58% yield of white 21-(7-methoxy-benzofuran-2-carboxylic acid ester) of triamcinolone acetonide having a melting point of 173 to 175° C.

EXAMPLE X

*Preparation of 21-(7-chloro-1,4-benzodioxane-2-carboxylic acid ester) of triamcinolone acetonide*

Using the procedure of Example V, 0.5 gm. of triamcinolone acetonide and 0.329 gm. of 7-chloro-1,4-benzodioxane-2-carboxylic acid were reacted at room temperature for 2 days to obtain an 87% yield of white 21-(7 - chloro-1,4-benzodioxane-2-carboxylic acid ester) of triamcinolone acetonide having a melting point of 197 to 198° C.

EXAMPLE XI

*Preparation of 21-(5,7-dibromo-benzofuran-3-carboxylic acid ester) of triamcinolone acetonide*

Using the procedure of Example I, 0.5 gm. of triamcinolone acetonide and 1.32 gm. of 5,7-dibromo-benzofuran-3-carboxylic acid bromide were reacted at room temperature for 4 days to obtain a 24% yield of light yellow 21 - (5,7 - dibromo-benzofuran-3-carboxylic acid ester) of triamcinolone acetonide, having a melting point of 271 to 273° C.

EXAMPLE XII

*Preparation of 21-(2-phenyl-5,6,7-trimethoxy-benzofuran-2-carboxylic acid ester) of triamcinolone acetonide*

Using the procedure of Example I, 0.5 gm. of triamcinolone acetonide and 0.739 gm. of 2-phenyl-5,6,7-trimethoxy-benzofuran-2-carboxylic acid chloride were reacted at room temperature for 3 days to obtain a 41% yield of white 21-(2-phenyl-5,6,7-trimethoxy-benzofuran-2-carboxylic acid ester) of triamcinolone acetonide having a melting point of 246 to 248° C.

EXAMPLE XIII

*Preparation of 21-(5,7-dinitro-benzofuran-3-carboxylic acid ester) of triamcinolone acetonide*

Using the procedure of Example I, 0.5 gm. of triamcinolone acetonide and 0.622 gm. of 5,7-dinitro-benzofuran-3-carboxylic acid chloride were reacted at room temperature for 1½ days to obtain 24% yield of yellow 21-(5,7-dinitro-benzofuran-3-carboxylic acid ester) of triamcinolone acetonide having a melting point of 186 to 187° C.

EXAMPLE XIV

*Preparation of 21-(5-chloro-benzofuran-3-carboxylic acid ester) of triamcinolone acetonide*

Using the procedure of Example I, 0.5 gm. of triamcino acetonide and 0.495 gm. of 5-chloro-benzofuran-3-carboxylic acid chloride were reacted for 3 hours at room temperature to obtain a 27% yield of white 21-(5-chloro-benzofuran-3-carboxylic acid ester) of triamcinolone acetonide having a melting point of 248 to 250° C.

EXAMPLE XV

*Preparation of 21-(3-methyl-1,4-benzodioxane-2-carboxylic acid ester) of triamcinolone acetonide*

Using the procedure of Example I, 0.5 gm. of triamcinolone acetonide and 0.484 gm. of 3-methyl-1,4-benzo-dioxane-3-carboxylic acid chloride were reacted for 5 hours at room temperature to obtain a 54% yield of white 21 - (3-methyl-1,4-benzodioxane-2-carboxylic acid ester) of triamcinolone acetonide having a melting point of 239 to 241° C.

EXAMPLE XVI

*Preparation of 21-(benzofuran-2-carboxylic acid ester) of triamcinolone acetonide*

0.1 gm. of 21-bromo-triamcinolone acetonide and 0.112 gm. of the silver salt of cumarilic acid in 5 cc. of acetonitrile were reacted for 2 days. Then, the suspension was filtered and the filtrate was concentrated to dryness and the residue was extracted with a 1:1 mixture of chloroform and methanol. The extract was concentrated until crystallization and the resulting white crystals were isolated to obtain a 72% yield of 21-(benzofuran-2-carboxylic acid ester) of triamcinolone acetonide having a melting point of 249 to 250° C.

EXAMPLE XVII

*Preparation of 21-(6-benzyloxy-benzofuran-2-carboxylic acid ester) of triamcinolone acetonide*

Using the procedure of Example I, 0.5 gm. of triamcinolone acetonide and 0.75 gm. of 6-benzyloxy-benzofuran-2-carboxylic acid chloride were reacted 10 hours at room temperature to obtain a 36% yield of white 21-(6-benzyloxy-benzofuran-2-carboxylic acid ester) of triamcinolone acetonide having a melting point of 231 to 233° C.

PHARMACEUTICAL COMPOSITIONS

*Example A.*—5.0 gm. of glycerine monostearate, 30 gm. of wool fat and 35 gm. of Vaseline were melted and heated to 70° C. 0.1 gm. of methyl p-hydroxybenzoate was dissolved in 29.85 gm. of distilled water at 80° C. and the solution was then cooled to 70° C. and emulsified with the fat melt at 70° C. The emulsion was cooled to 40° C. and then 0.05 gm. of micronized 21-benzofuran-2-carboxylic acid ester of triamcinolone acetonide was stirred into the emulsion and the emulsion was stirred until cool to obtain an ointment.

*Example B.*—5.0 gm. of isopropyl myristate, 5.0 gm. of cetyl alcohol, 6.0 gm. of glycerine monostearate and 4.0 gm. of polyoxyethylene sorbitan monostearate (Tween 60) were melted together and emulsified into a solution of 0.1 gm. of methyl p-hydroxybenzoate in 79.85 gm. of distilled water at 60° C. The resulting cream was cooled 40° C. and 0.05 gm. of micronized 21-(benzofuran-carboxylic acid ester) of triamcinolone acetonide was distributed through the cream with an immersion homogenizer. The cream was stirred until cold and was then rolled.

*Example C.*—0.5 gm. of hexachlorophene and 0.05 gm. of 21-(benzofuran-2-carboxylic acid ester) of triamcinolone acetonide were dissolved in 65.0 gm. of ethanol with stirring and 0.2 gm. 2422 Martens perfume in 34.25 gm. of distilled water was stirred into the ethanol solution. The said solution was then filtered through a suitable filter until free from fibres to obtain a tincture.

*Example D.*—2.5 gm. of self-emulsifying cetyl stearyl alcohol (Lanette N) and 2.0 gm. of isopropyl myristate were melted together and held at 70° C. 0.1 gm. of methyl p-hydroxybenzoate was dissolved in 91.35 gm. of distilled water at 80° C. and after the addition of 4.0 gm. of glycerine thereto, the fatty melt was emulsified into the solution at 70° C. The emulsion was stirred until cold and 0.05 gm. of micronized 21-(benzofuran-2-carboxylic acid ester) of triamcinolone acetonide thoroughly distributed therethrough with an immersion homogenizer to obtain a lotion.

*Example E.*—0.05 gm. of 21-(benzofuran-2-carboxylic acid ester) of triamcinolone acetonide was dissolved in a mixture of 30.0 gm. of ethanol and 38.35 gm. of isopropanol with stirring and then 1.5 gm. of isopropyl myristate and 0.1 gm. of 2422 Martens perfume were added to the solution. The solution was then mixed in a known manner with 30.0 gm. of difluoro-dichloromethane and introduced into aerosol containers (refrigerated or pressure filling).

*Example F.*—0.2 gm. of sodium benzoate and 0.2 gm. of highly viscous carboxymethyl cellulose were dissolved in 87.30 gm. of distilled water and then 10.0 gm. of glycerine, 0.75 gm. of polymethylene sorbitan monooleate (Tween 80), 0.05 gm. of 21-(benzofuran-2-carboxylic acid ester) of triamcinolone and 1.5 gm. of aerosil were incorporated into the solution with stirring. The resulting suspension was homogenized and deaerated under vacuum.

Various modifications of the compositions of the invention may be made without departing from the spirit or scope thereof and it is to be understood that the invention is to be limited only as defined in the appended claims.

We claim:
1. Triamcinolone acetonide esters of the formula

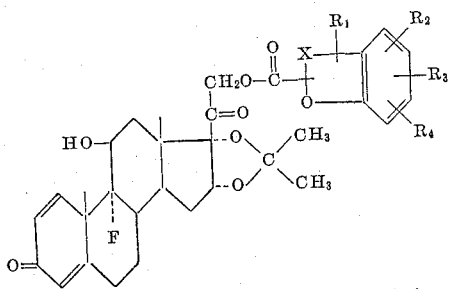

wherein $R_1$ is selected from the group consisting of hydrogen, lower alkyl of 1 to 7 carbon atoms and phenyl, $R_2$ is selected from the group consisting of hydrogen, halogen, nitro, lower alkyl and lower alkoxy of 1 to 7 carbon atoms, and benzyloxy, $R_3$ is selected from the group consisting of hydrogen, halogen, nitro and lower alkyl and lower alkoxy of 1 to 7 carbon atoms, $R_4$ is selected from the group consisting of hydrogen and lower alkoxy of 1 to 7 carbon atoms and X is selected from the group consisting of —CH$_2$—CH$_2$—O—, —CH$_2$—CH$_2$— and —CH=CH—.

2. 21-(benzofuran-2-carboxylic acid ester) of triamcinolone acetonide.

3. 21 - (8-methoxy-1,4-benzodioxane-3-carboxylic acid ester) of triamcinolone acetonide.

4. 21-(2,3-dihydrobenzofuran-2-carboxylic acid ester) of triamcinolone acetonide.

5. 21-(1,4-benzodioxane-3-carboxylic acid ester) of triamcinolone acetonide.

6. 21 - (7 - methyl-1,4-benzodioxane-3-carboxylic acid ester) of triamcinolone acetonide.

7. 21 - (5-nitro-7-methyl-1,4-benzodioxane-3-carboxylic acid ester) of triamcinolone acetonide.

8. 21-(5,7-dinitro-benzofuran-3-carboxylic acid ester) of triamcinolone acetonide.

9. 21 - (3 - methyl-1,4-benzodioxane-2-carboxylic acid ester) of triamcinolone acetonide.

10. 21-(6-benzyloxy-benzofuran-2-carboxylic acid ester) of triamcinolone acetonide.

11. 21-(3-methyl-benzofuran-2-carboxylic acid ester) of triamcinolone acetonide.

12. 21-(7-methoxy-benzofuran-2-carboxylic acid ester) of triamcinolone acetonide.

13. 21 - (7-chloro-1,4-benzodioxane-2-carboxylic acid ester) of triamcinolone acetonide.

14. 21-(5,7-dibromo-benzofuran-3-carboxylic acid ester) of triamcinolone acetonide.

15. 21-(2-phenyl - 5,6,7 - trimethoxy-benzofuran-2-carboxylic acid ester) of triamcinolone acetonide.

16. 21-(5-chloro-benzofuran-3-carboxylic acid ester) of triamcinolone acetonide.

17. A composition having glucocorticoidal and antiphlogistic properties comprised of a triamcinolone acetonide ester of the formula

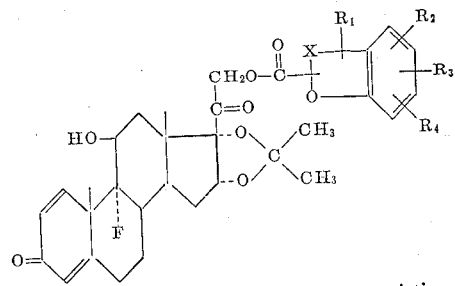

wherein $R_1$ is selected from the group consisting of hydrogen, lower alkyl of 1 to 7 carbon atoms and phenyl, $R_2$ is selected from the group consisting of hydrogen, halogen, nitro, lower alkyl and lower alkoxy of 1 to 7 carbon atoms, and benzyloxy, $R_3$ is selected from the group consisting of hydrogen, halogen, nitro and lower alkyl and lower alkoxy of 1 to 7 carbon atoms, $R_4$ is selected from the group consisting of hydrogen and lower alkoxy of 1 to 7 carbon atoms and X is selected from the group consisting of —CH$_2$—CH$_2$—O—, —CH$_2$—CH$_2$— and —CH=CH— and a major amount of a pharmaceutical carrier.

18. A composition having glucocorticoidal and antiphlogistic properties comprised of 0.02 to 0.1% of a triamcinolone acetonide ester of the formula

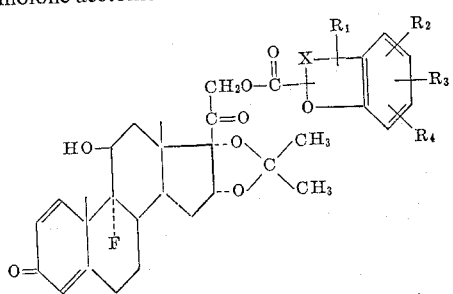

wherein $R_1$ is selected from the group consisting of hydrogen, lower alkyl of 1 to 7 carbon atoms and phenyl, $R_2$ is selected from the group consisting of hydrogen, halogen, nitro, lower alkyl and lower alkoxy of 1 to 7 carbon atoms, benzyloxy, $R_3$ is selected from the group consisting of hydrogen, halogen, nitro and lower alkyl and lower alkoxy of 1 to 7 carbon atoms, $R_4$ is selected from the group consisting of hydrogen and lower alkoxy of 1 to 7 carbon atoms and X is selected from the group consisting of —CH$_2$—CH$_2$—O—, —CH$_2$—CH$_2$— and —CH=CH— and a major amount of a topical pharmaceutical carrier.

19. The composition of claim 17 wherein the said ester is 21-(benzofuran-2-carboxylic acid ester) of triamcinolone acetonide.

20. A method of inhibiting inflammation in animals comprising administering daily an effective amount of a triamcinolone acetonide ester of the formula

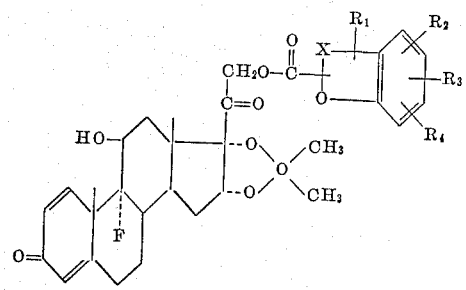

wherein $R_1$ is selected from the group consisting of hydrogen, lower alkyl of 1 to 7 carbon atoms and phenyl, $R_2$ is selected from the group consisting of hydrogen, halogen, nitro, lower alkyl and lower alkoxy of 1 to 7 carbon atoms, and benzyloxy, $R_3$ is selected from the group consisting of hydrogen, halogen, nitro and lower alkyl and lower alkoxy of 1 to 7 carbon atoms, $R_4$ is selected from the group consisting of hydrogen and lower alkoxy of 1 to 7 carbon atoms and X is selected from the group consisting of —CH$_2$—CH$_2$—O—, —CH$_2$—CH$_2$— and —CH=CH—.

21. The method of claim 20 wherein the said ester is 21-(benzofuran-2-carboxylic acid ester) of triamcinolone acetonide.

References Cited by the Examiner
UNITED STATES PATENTS

| | | | |
|---|---|---|---|
| 3,027,366 | 3/1962 | Francis | 260—239.55 |
| 3,167,544 | 1/1965 | Heider et al. | 260—239.5 |
| 3,176,012 | 3/1965 | Bertin | 260—239.55 |

LEWIS GOTTS, *Primary Examiner.*

HENRY A. FRENCH, *Assistant Examiner.*